United States Patent [19]
Kao

[11] Patent Number: 5,202,599
[45] Date of Patent: Apr. 13, 1993

[54] ELECTRIC MOTOR

[76] Inventor: Wen-Chung Kao, No. 416, Chung-Shan Road, Chia-Li Chen, Tainan Hsien, Taiwan

[21] Appl. No.: 879,914

[22] Filed: May 8, 1992

[51] Int. Cl.⁵ .......................................... H02K 13/04
[52] U.S. Cl. .................................. 310/234; 310/154; 310/198; 310/248
[58] Field of Search ............... 310/234, 198, 154, 261, 310/233, 248

[56] References Cited

U.S. PATENT DOCUMENTS

| | | | |
|---|---|---|---|
| 4,404,485 | 9/1983 | Ban | 310/198 |
| 4,437,029 | 3/1984 | Ban | 310/198 |
| 4,459,503 | 7/1984 | Kropp | 310/198 |
| 4,580,072 | 4/1986 | Morishita | 310/154 |
| 4,583,016 | 4/1986 | Ban | 310/198 |
| 4,636,107 | 1/1987 | Casler | 310/154 |
| 4,745,319 | 5/1987 | Tomite | 310/154 |
| 4,876,472 | 10/1989 | Shiraki | 310/198 |
| 4,973,871 | 11/1990 | Bisantz | 310/154 |
| 5,044,065 | 9/1991 | Dyke | 310/234 |
| 5,072,129 | 12/1991 | Sugiyama | 310/198 |

FOREIGN PATENT DOCUMENTS 1458943  2/1989  U.S.S.R. .............. 310/234

Primary Examiner—R. Skudy
Attorney, Agent, or Firm—Morton J. Rosenberg; David I. Klein

[57] ABSTRACT

An electric motor has a stator comprising a plurality of permanent magnets disposed on an interior surface of the stator and an armature comprising a plurality of pole segments equally spaced apart on a shaft. Each pole segment is wound with a coil, which is powered to induce a magnetic field to interact with one of the permanent magnets in the stator. Four of the armature coils provide magnetized poles to interact with the plurality of poles of the stator at a time, to produce a powerful torque for rotating the armature.

3 Claims, 5 Drawing Sheets

ELECTRIC MOTOR

BACKGROUND OF THE INVENTION

An electric motor generally has an armature and its winding which combines with a stator to produce torque. A generator also has an armature and its winding which combines with a stator to produce emf (electromotive force). The armature winding is formed by various methods, but a main method used is a drum winding. Drum windings include two kinds, one called a lap (or multiple) winding or a parallel winding and the other a wave winding or a series winding. The former is generally used in an electric machine for large capacity (or current) and the latter is used in a machine for medium or small capacity or comparatively high voltage.

The machines having an armature with its winding based on the above-mentioned method may have such problems as biasing of the magnetic neutral phase and cross-magnetism effect, which leads to commutating difficulty, having the effect of a decrease in emf produced in a generator or a decrease of torque produced in a motor. So extra compensating windings and intermediate poles with windings are needed to be additionally provided to the ordinary windings, so as to offset the emf that is induced by flux generated by reaction of the armature. But, the addition of the compensating windings and the intermediate pole, and its winding, can enlarge the dimension of a motor and makes its structure more complicated.

SUMMARY OF THE INVENTION

This invention has been devised to change the conventional method of armature winding for an electric machine such as motors and generators, wherein armature windings are simplified to be of smaller size, to use less electricity, but able to provide more output than that of a conventional machine, without using compensating windings, and an intermediate pole with its associated winding.

The electric machine in the present invention comprises an armature which has a plurality of pole segments around which are wound a separate independent coil, to form a separate independent circuit by having its opposing ends connected to each two conductive segments of a commutator, and each conductive segment is moved to contact with one of the brushes so that the pole segments are powered to induce magnetism for interacting with the respective poles formed with permanent magnets in a stator. Thus, a number of magnetic fields can be generated by all the coils in the armature at the same time to interact with the poles in the stator, thereby producing a large torque as if produced by a number of separate motors when all the coils are powered.

DETAILED DESCRIPTION OF THE PREFERRED EMBODIMENTS

Figure 1:
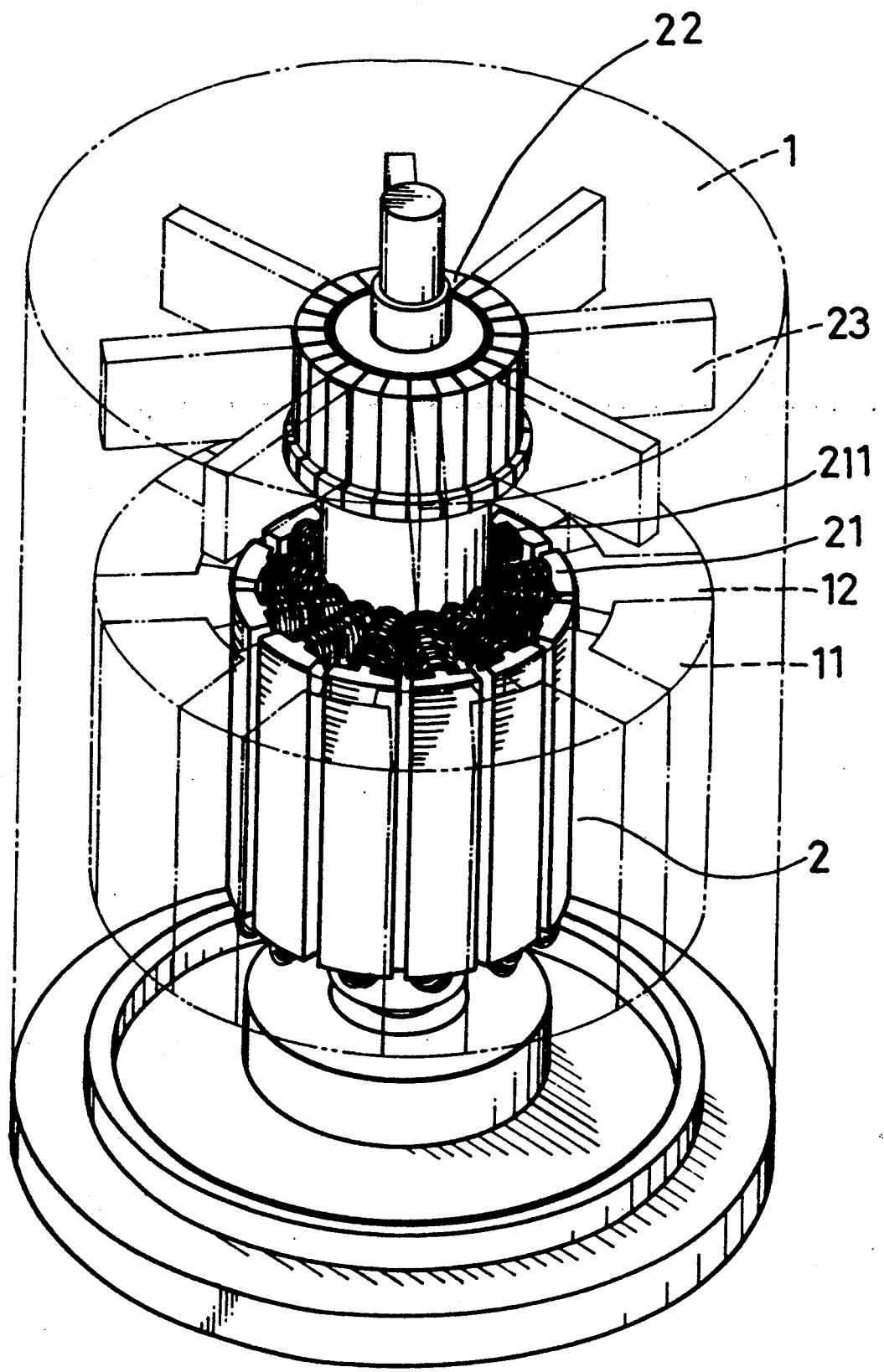
FIG. 1 is a perspective view of the armature in the electric motor in the present invention.

The electric motor in accordance with the present invention comprises a stator 1 and an armature 2 as the main components, as shown in FIG. 1.

The stator 1 has a plurality of permanent magnets 11 equally spaced apart on its inner circular surface, and a silicon steel piece 12 is interposed between each two magnets 11.

The armature 2 has a plurality of pole segments 21, around which are respectively wound a separate independent coil 211. Both ends of each coil are connected with respective conductive segments in a commutator 22, providing an independent circuit to be powered through the conductive segments of the commutator 22 and the brushes 23, located within the stator (FIG. 3).

Figure 2:
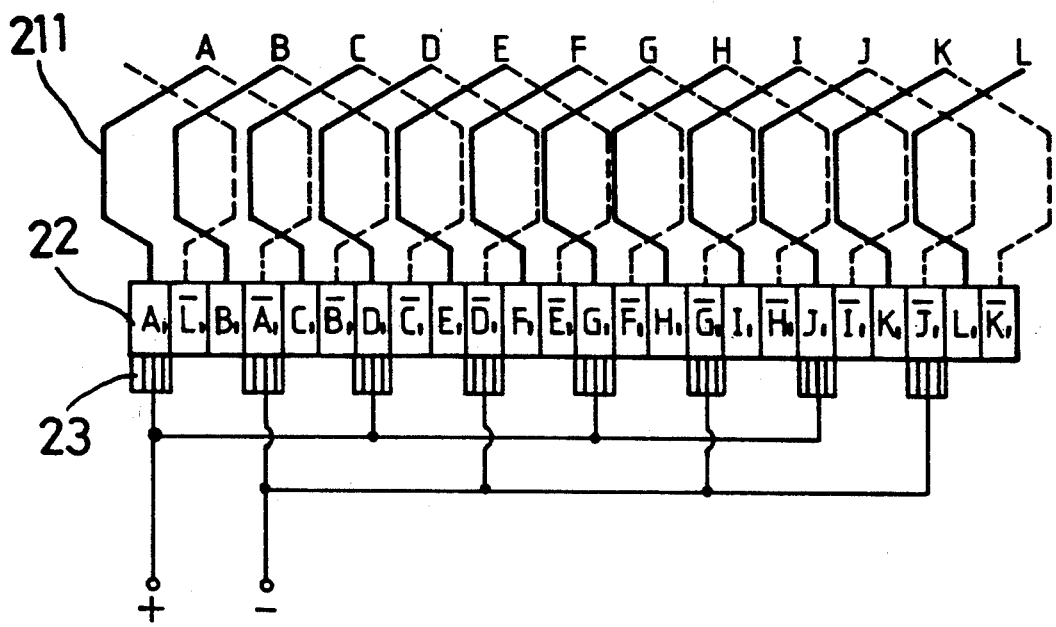
FIG. 2 is a diagram of wiring of the brushes in relation to the commutator and the coils in the armature in the electric motor in the present invention.
Figure 3:
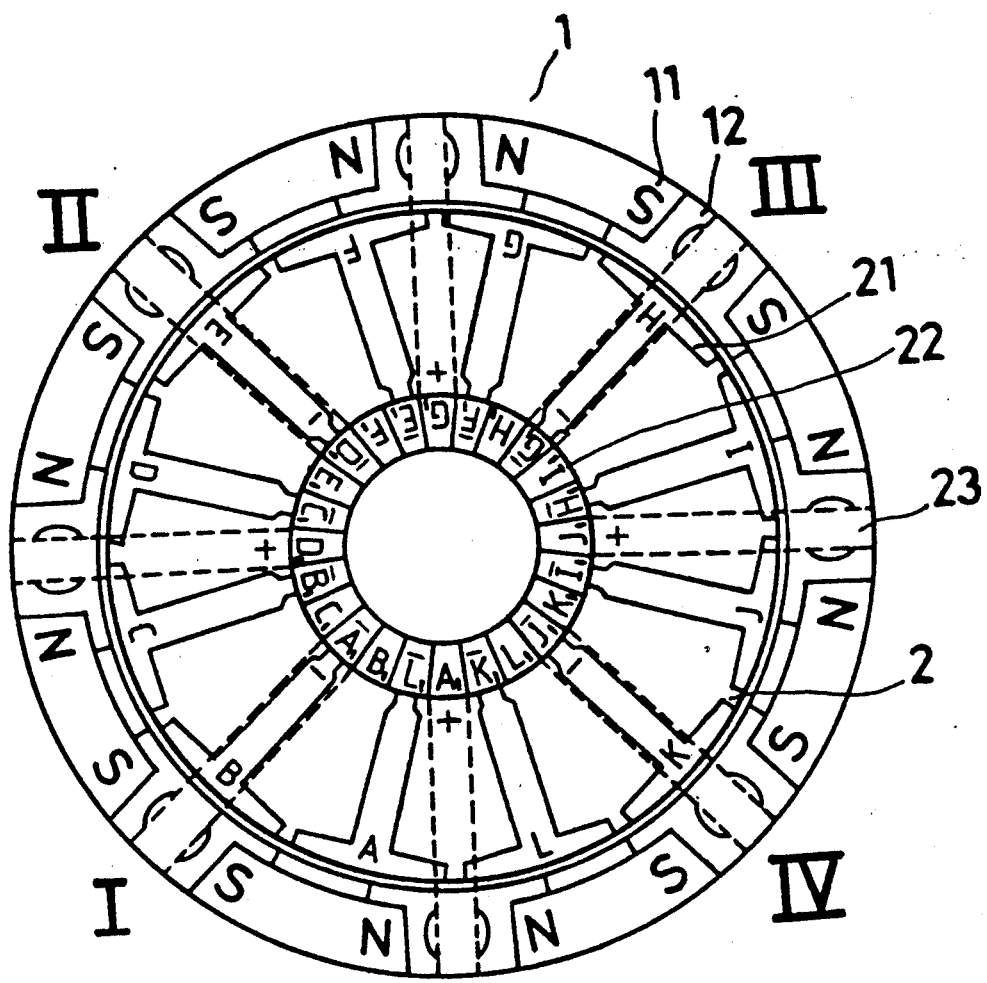
FIG. 3 is a cross-sectional view of the electric motor, showing the relation of the pole segments in the armature and the poles in the stator in the present invention.

In its practical embodiments, as shown in FIGS. 2 and 3, a DC motor is provided with 8 poles, for example. The commutator 22 of the armature 2 is divided into 24 conductive segments, with groups of two spatially displaced segments being connected with opposing ends of a respective independent coil 211. Each coil 211 being wound around a respective one of the 12 pole segments 21 to form independent circuits. All of the pole segments 21 form 12 units, A–L, with opposing ends of each winding being designated $A_1$, $\overline{A}_1$; $B_1$, $\overline{B}_1$; $C_1$, $\overline{C}_1$; $D_1$, $\overline{D}_1$; $E_1$, $\overline{E}_1$; $F_1$, $\overline{F}_1$; $G_1$, $\overline{G}_1$; $H_1$, $\overline{H}_1$; $I_1$, $\overline{I}_1$; $J_1$, $\overline{J}_1$; $K_1$, $\overline{K}_1$; and $L_1^{\mathstrut}$, $\overline{L}_1$. The brushes 23 are in contact with the commutator 22, with 4 pairs of brushes provided to transmit DC current to the commutator 22.

When DC current is fed to all the coils 211 through the brushes 23 and the commutator 22, 4 groups of separate magnetic fields are generated by the coils 211 to interact with the poles or the permanent magnets 11 in the stator 1. A large torque is thereby produced, as if four separate motors were functioning at the same time.

Figure 6:
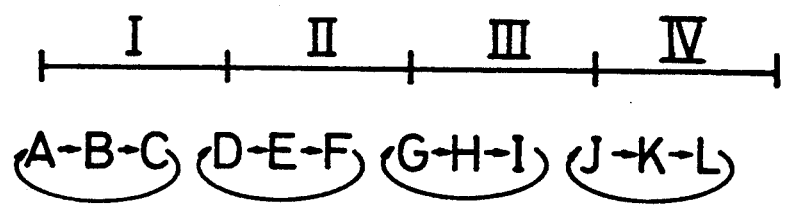
Figure 4:
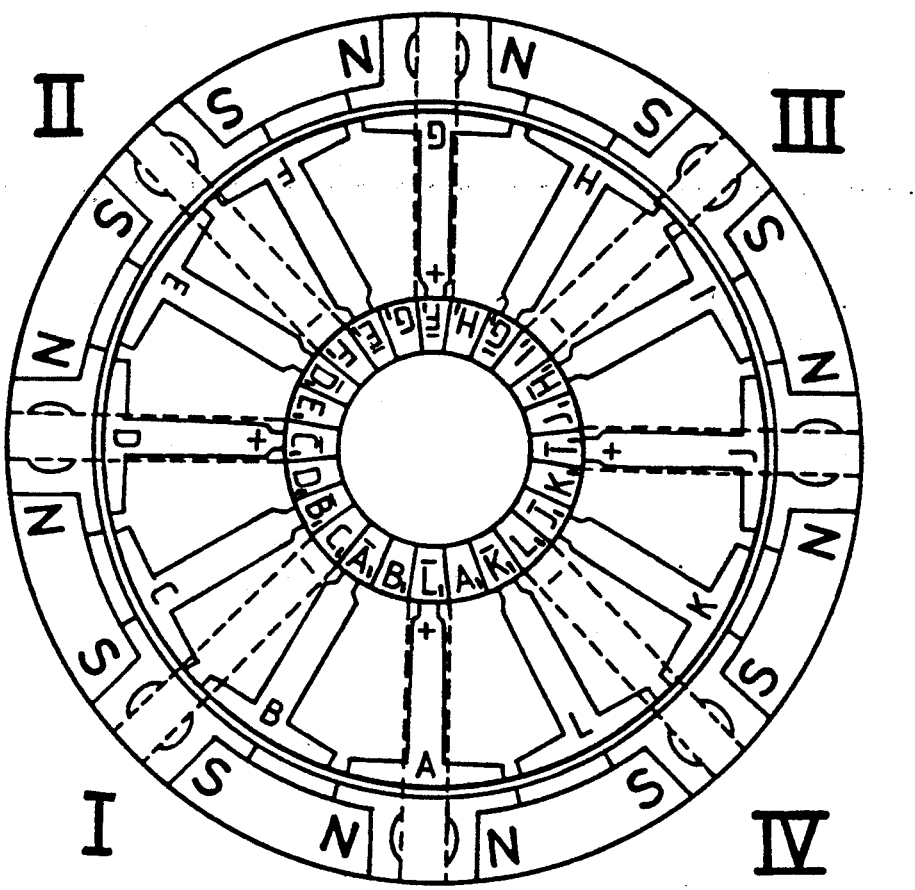
FIG. 4 is a cross-sectional view of the electric motor, showing movement of the pole segments in the armature in relation to the poles of the stator in the present invention.
Figure 5:
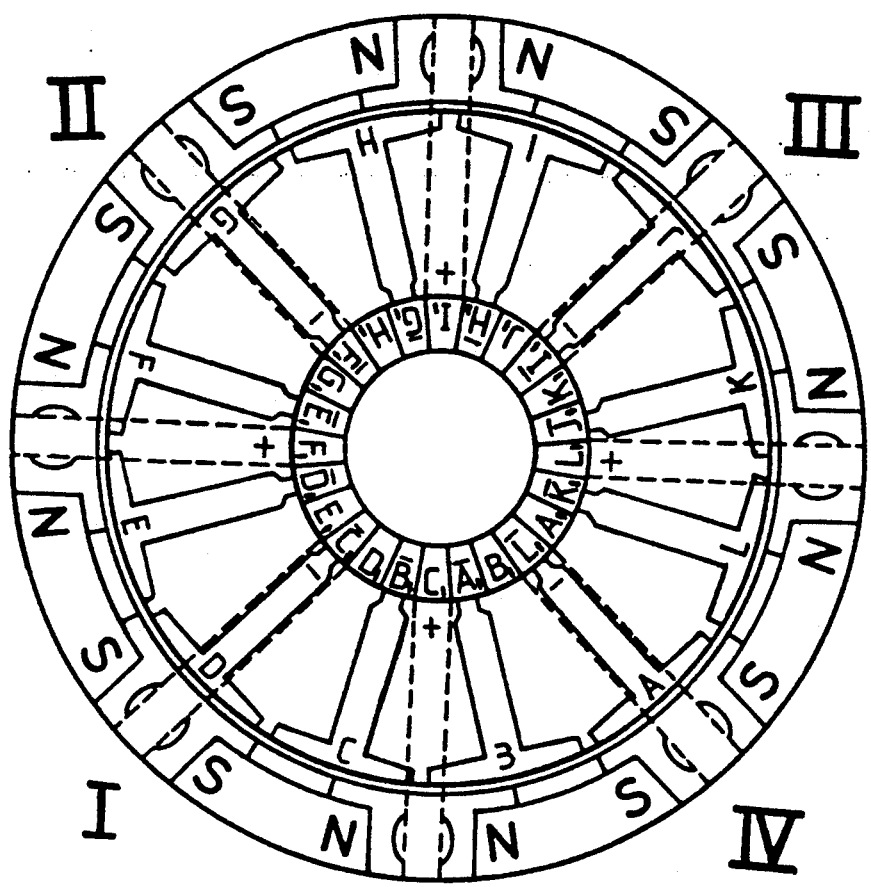
FIG. 5 is a cross-sectional view of the electric motor in the present invention, showing movement of the pole segments in the armature in relation to the poles of the stator; and, FIG. 6 is the time division for the armature segments actuated in the electric motor in the present invention.

FIG. 3 shows a cross-sectional view of the DC motor in the present invention, showing how the pole segments 21 of the armature 2 and the poles in the stator 1 interact with one another. The stator 1 is divided into 4 quadrants or portions I, II, III, IV, functionally by the brushes 23, with each portion having two permanent magnets 11 to interact with each of three respective pole segments 21 of the armature 2. Now, consider the brushes 23 as serving a separating function, and the portion I of the stator 1 interacts with the pole segments A, B, C of the armature 2, the portion II to the pole segments D, E, F, the portion III to the pole segments G, H, I, and the portion IV to the pole segments J, K, L. The DC current is fed through all of the coils 211 on all the pole segments 21 in a predetermined sequence through the brushes 23 and the commutator 22. First the pole segment A can induce a magnetic field to repel the pole of the same polarity of the particular permanent magnet 11 in the stator 1 which is facing the pole segment A, as shown in FIG. 3, generating pushing (or rotating) force or torque to move or rotate the armature 2. Then the original commutator contact $A_1$ in the commutator 22 which was in contact with one of the brushes 23 is changed to contact $\overline{L}_1$ by the armature rotation, as shown in FIG. 4, and $\overline{J}_1$ contact is replaced by $L_1$ contact. At this position, any of the brushes 23 has not yet contacted the positions of $B_1$ and $\overline{B}_1$ contacts in the commutator 22. Therefore, the pole segment B is not magnetized, and will not interact with the permanent magnet 11 facing the pole segment B, not forming a pulling force to add to the movement initiated by the pole segment A, and does not contribute to the rotation of the armature 2 at this point in the cycle. At the same time pole segment L is magnetized, the pole segment C is magnetized to produce a repelling force against the permanent magnet 11 facing the pole segment C, as the conductive contacts $C_1$, $\overline{C}_1$ in the commutator 22 receives current from the brushes 23, and the armature is further rotated, again changing the contact points of the commutator 22 in contact with brushes 23 from contacts $\overline{L}_1$ to $B_1$ and $C_1$ to $\overline{B}_1$. Then the pole segment B induces a magnetic field to repel the permanent magnet 11 facing the pole segment B, but the pole segment C does not form a pulling force. Simultaneously the pole segment D produces a magnetic field to reject the permanent magnet 11 facing the pole segment D as the conductive contacts $D_1$, $\overline{D}_1$ of the commutator 22 respectively contact one of the brushes 23 to receive magnetization current. In this way, the I portion of the armature 2, which is one quarter of the rotation of the armature 2 is shown to be continuously contributing torque by sequential energization of the coils. Simultaneously, the remaining portions, II, III, IV, in the armature 2 and the stator 1 interact in the same way as portion I and thereby contribute to the rotation of the armature 2. As a function of time, it is illustrated in FIG. 6, that one of the pole segments 21 in each of four portions interact with the stator 1 at the same time, for example, the pole segment A in portion I, the pole segment D in portion II, the pole segment G in portion III and pole segment J in portion IV, each interact with a respective and corresponding pole in the stator 1, at the same time. Therefore, the 4 groups of magnetic fields are simultaneously induced to interact with the permanent magnets 11, generating a large torque as if obtained from four separate motors. By this arrangement, the power output generated by the armature 2 is greatly increased. In addition, all the coils 211 wound around the pole segments 21 are independent from one another, and are able to interact with one another for compensating phenomenon of bias of a neutral phase of magnetism, and therefore compensational windings and intermediate pole windings found in common DC motors are not required, and thereby provide structure of a DC motor which is simpler, and which consumes less electricity, but provides an increase in rotating torque.

What is claimed is:

1. An electric motor, comprising:

a longitudinally extended stator having a cylindrical tubular contour, said stator having a plurality of permanent magnets disposed on an inner surface thereof in angular spaced relation with respect to a central axis extending in a longitudinal direction, said plurality of permanent magnets each being separated one from another by a respective one of a plurality of silicon steel members to define a plurality of permanent magnetic poles;

an armature disposed within a central bore of said stator for rotation about said central axis, said armature including:

a. a plurality of pole segments equally spaced about said central axis;

b. a plurality of coils, each of said coils being wound on a respective one of said plurality of pole segments;

c. a commutator having a M number of conductive contact members, where M is defined by three times a number of permanent magnet poles of said stator, each of said plurality of coils being electrically coupled on opposing ends thereof to a distinct pair of said conductive contact members, said plurality of coils defining N number of coils where N equals one half M; and, a plurality of pairs of brushes secured to said stator for electrical contact with respective pairs of said conductive contact members of said commutator, whereby a predetermined number of said plurality of coils are independently and simultaneously energized to contribute to a torque output of said motor.

2. The electric motor as recited in claim 1 where said plurality of pairs of brushes is defined by four pairs of brushes disposed in quadrature relationship.

3. The electric motor as recited in claim 2 where said stator has eight permanent magnet poles and said armature includes twelve pole segments and a commutator having twenty-four electrical contact members.

* * * * *